(12) United States Patent
Hristov et al.

(10) Patent No.: US 12,535,855 B1
(45) Date of Patent: Jan. 27, 2026

(54) TERRACED BATTERY SYSTEM FOR WEARABLE ELECTRONIC DEVICE

(71) Applicants: Stoyan Hristov, Gilroy, CA (US); Gerald Nilles, Culver City, CA (US)

(72) Inventors: Stoyan Hristov, Gilroy, CA (US); Gerald Nilles, Culver City, CA (US)

(73) Assignee: Snap Inc., Santa Monica, CA (US)

( * ) Notice: Subject to any disclaimer, the term of this patent is extended or adjusted under 35 U.S.C. 154(b) by 270 days.

(21) Appl. No.: 18/196,353

(22) Filed: May 11, 2023

(51) Int. Cl.
*G06F 1/16* (2006.01)
*G02C 11/00* (2006.01)
*H01M 10/04* (2006.01)

(52) U.S. Cl.
CPC ............ *G06F 1/1635* (2013.01); *G02C 11/10* (2013.01); *G06F 1/163* (2013.01); *H01M 10/04* (2013.01); *H01M 2220/30* (2013.01)

(58) Field of Classification Search
CPC ........................................... G06F 1/163
USPC ...................................... 361/679.03
See application file for complete search history.

(56) References Cited

U.S. PATENT DOCUMENTS

| | | | | |
|---|---|---|---|---|
| 5,319,397 A * | 6/1994 | Ryden | ............... | G02C 11/08 219/522 |
| 5,768,100 A * | 6/1998 | Barrus | ............... | G06F 1/1616 361/679.41 |
| 5,958,088 A * | 9/1999 | Vu | ............... | H01M 50/553 29/623.1 |
| 6,224,995 B1 * | 5/2001 | Fauteux | ............... | H01M 4/661 429/57 |
| 6,599,659 B1 * | 7/2003 | Endo | ............... | H01M 4/667 429/300 |
| 7,163,762 B2 * | 1/2007 | Endo | ............... | H01M 10/0431 429/300 |
| 7,704,633 B2 * | 4/2010 | Endo | ............... | H01M 10/058 429/300 |
| 8,808,031 B2 * | 8/2014 | Zhao | ............... | H01M 10/425 439/620.33 |
| 9,276,287 B2 * | 3/2016 | Bhardwaj | ............... | H01M 10/0565 |
| 9,356,262 B2 * | 5/2016 | Kim | ............... | H01M 50/572 |
| 9,929,393 B2 * | 3/2018 | Shiu | ............... | H01M 10/0431 |
| 10,135,097 B2 * | 11/2018 | Spare | ............... | H01M 10/0436 |
| 10,763,535 B2 * | 9/2020 | Nikkhoo | ............... | H01M 4/78 |
| 10,809,309 B2 * | 10/2020 | Cui | ............... | B60L 58/16 |
| 11,024,887 B2 * | 6/2021 | Spare | ............... | H01M 10/0565 |
| 11,262,808 B2 * | 3/2022 | Daube | ............... | G01C 19/00 |

(Continued)

*Primary Examiner* — Adrian S Wilson
(74) *Attorney, Agent, or Firm* — CM Law; Stephen J. Weed (57) ABSTRACT

A terraced battery system is provided that may enhance the battery packaging efficiency within an organic shape of a wearable electronic device such as an electronic eyewear device. The terraced battery includes several stacked cells of different geometries. The terraced battery geometries are selected to better accommodate organic (non-trapezoidal and non-cylindrical) shapes of the battery housing in the wearable electronic device. In an example, the terraced battery geometry is adapted to accommodate the organic shape of a battery housing in the temples of an augmented reality electronic eyewear device. As the number of the battery cells or terraces increases, the battery packaging efficiency can be further improved within an organic shape of the battery housing. The increased packaging efficiency for the battery enables increased battery life within organically shaped enclosures.

19 Claims, 9 Drawing Sheets

(56) References Cited

U.S. PATENT DOCUMENTS

| | | | |
|---|---|---|---|
| 11,495,876 B2* | 11/2022 | Potens | H01Q 1/48 |
| 11,784,725 B2* | 10/2023 | Zheng | H04B 17/318 |
| | | | 343/702 |
| 2009/0093173 A1* | 4/2009 | Yasumura | H05K 1/117 |
| | | | 439/890 |
| 2011/0097615 A1* | 4/2011 | Goh | H01M 10/04 |
| | | | 29/623.2 |
| 2011/0183183 A1* | 7/2011 | Grady | H01M 10/0436 |
| | | | 429/162 |
| 2011/0292598 A1* | 12/2011 | Hendren | G06F 1/26 |
| | | | 361/679.55 |
| 2012/0177953 A1* | 7/2012 | Bhardwaj | H01M 50/121 |
| | | | 29/623.2 |
| 2012/0268880 A1* | 10/2012 | Tomita | G06F 1/1643 |
| | | | 361/679.09 |
| 2013/0108907 A1* | 5/2013 | Bhardwaj | H01M 10/0431 |
| | | | 29/623.2 |
| 2013/0308282 A1* | 11/2013 | Shin | H05K 1/0277 |
| | | | 361/748 |
| 2014/0113184 A1* | 4/2014 | Hamel | H01M 10/0436 |
| | | | 429/163 |
| 2015/0016035 A1* | 1/2015 | Tussy | G06F 1/1635 |
| | | | 361/679.03 |
| 2016/0014924 A1* | 1/2016 | Peng | H04M 1/0277 |
| | | | 361/752 |
| 2016/0021226 A1* | 1/2016 | Allore | H04M 1/0262 |
| | | | 455/566 |
| 2016/0085278 A1* | 3/2016 | Osterhout | G06F 1/206 |
| | | | 361/679.03 |
| 2017/0357214 A1* | 12/2017 | Choi | H01M 50/105 |
| 2018/0284197 A1* | 10/2018 | Cui | H01M 10/486 |
| 2020/0073148 A1* | 3/2020 | Alhaideri | G02F 1/172 |
| 2021/0098837 A1* | 4/2021 | Ashwood | G02B 27/0176 |
| 2021/0173451 A1* | 6/2021 | Daube | G01P 15/02 |
| 2022/0103752 A1* | 3/2022 | Ding | G06F 1/163 |
| 2022/0147117 A1* | 5/2022 | Daube | G01C 21/08 |
| 2022/0319364 A1* | 10/2022 | Heger | G09G 3/3406 |
| 2022/0357577 A1* | 11/2022 | Ashwood | G02B 27/0093 |
| 2022/0365348 A1* | 11/2022 | Hanumante | G06F 1/26 |
| 2022/0373401 A1* | 11/2022 | Ashwood | G06F 3/013 |
| 2023/0063078 A1* | 3/2023 | Vadivelu | G06F 13/4282 |
| 2023/0147580 A1* | 5/2023 | Kim | G02C 5/14 |
| | | | 361/679.03 |
| 2023/0360567 A1* | 11/2023 | Yang | G09G 3/002 |
| 2024/0337867 A1* | 10/2024 | Xu | G02B 27/017 |

\* cited by examiner

TERRACED BATTERY SYSTEM FOR WEARABLE ELECTRONIC DEVICE

TECHNICAL FIELD

Examples set forth in the present disclosure relate to portable electronic devices, including wearable electronic devices such as smart glasses. More particularly, but not by way of limitation, the present disclosure describes a terraced battery system with several stacked cells of different geometries adapted to accommodate the organic shape of the available space in a battery compartment of a wearable electronic device.

BACKGROUND

Wearable consumer electronic devices require on board battery systems to power the electronic components. However, the available space for the battery systems in wearable electronic devices such as augmented reality or virtual reality glasses is quite limited. Moreover, the available battery locations may be limited by the organic (i.e., non-rectilinear and non-cylindrical) geometries of the battery locations, thus significantly limiting the size of the batteries and hence limiting the battery life available for wearable electronic devices.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

A terraced battery system is provided that may enhance the battery packaging efficiency within an organic shape of a wearable electronic device such as an electronic eyewear device. As described herein, a terraced battery may be defined as a battery with several stacked cells of different geometries. In sample configurations, the terraced battery geometries are selected to better accommodate the more organic (i.e., non-rectangular or non-cylindrical) shape of the battery housing in the wearable electronic device. For example, the terraced battery geometry may be adapted to accommodate the organic shape of a battery housing in the temples of an augmented reality electronic eyewear device. As the number of battery cells or terraces increases, the battery packaging efficiency can be further enhanced within an organic shape of the battery housing. The increased packaging efficiency for the battery enables increased battery life within organically (e.g., non-rectangular and non-cylindrical) shaped enclosures.

As used herein, a "stacked" component means that a planar surface (e.g., a top surface) of one component is adjacent a planar surface (e.g., a bottom surface) of another component. In sample configurations, a terraced battery system is provided that includes a first battery cell and a second battery cell stacked on the first battery cell. The first and second battery cells have different sizes and/or different shapes from each other, and the stacked first and second battery cells have a collective size and shape that is non-rectangular and is non-cylindrical. The first and second battery cells have respective positive terminals connected to each other and respective negative terminals connected to each other. In the sample configurations, the collective size and shape of the stacked first and second battery cells are adapted to fit a non-rectangularly and non-cylindrically shaped battery compartment. A third battery cell may be stacked on the second battery cell that has a different size and/or different shape from the first and second battery cells to form a terraced configuration.

In the sample configurations, the first battery cell and the second battery cell may be aligned along a common edge to connect the respective positive terminals of the batteries together and the respective negative terminals of the batteries together. An insulative coating may be applied around an outer perimeter of the first battery cell and the second battery cell to electrically isolate the first battery cell and the second battery cell from each other. The first battery cell and the second battery cell may have a variety of shapes that are at least one of rectangular, trapezoidal, cylindrical, or disc-shaped whereby the shapes and sizes of the battery cells are selected in accordance with a size and shape of the non-rectangularly and non-cylindrically shaped battery compartment. For example, the non-rectangularly and non-cylindrically shaped battery compartment may be a temple enclosure of a wearable electronic eyewear device.

The description herein further relates to a wearable electronic eyewear device having a frame, at least one temple connected to the frame, at least one battery powered device, a battery compartment having power connections to the at least one battery powered device, and a terraced battery system disposed in the battery compartment. In the sample configurations, the terraced battery system includes a first battery cell and a second battery cell stacked on the first battery cell, the second battery cell having at least one of a different size or shape from the first battery cell. The first and second battery cells also have respective positive terminals that are connected to each other and respective negative terminals that are connected to each other. The battery cells are selected whereby a collective size and shape of the stacked first and second battery cells is non-rectangular and is non-cylindrical and approximates a shape of the battery compartment. In sample configurations, the battery compartment is disposed in the at least one temple of the wearable electronic eyewear device and has a non-rectangular and non-cylindrical shape.

In the sample configurations, the temple may include a connector or one or more pins adapted to connect the terraced battery system to an outside power source for charging. The battery compartment also may have an opening, and the at least one temple may have a cap adjacent the opening of the battery compartment that flexes to enable the cap to open to provide access to the terraced battery system within the battery compartment.

In other sample configurations, a connector lead is provided that is adapted to run along a surface of the terraced battery system to connect to at least one of the power connections. The connector lead may be wound across the surface of the terraced battery to form a service loop. In the sample configurations, the battery compartment may include an opening, and the terraced battery system and connector lead are nested in the opening so as to allow access to the terraced battery system.

In still other sample configurations, the power connections are located adjacent to one of the first or second battery cells. Also, the terraced battery system is co-located with an antenna and/or a speaker.

The descriptions herein further describe a method of providing power to a battery powered electronic device of a wearable electronic eyewear device. The method includes selecting at least two battery cells having sizes and shapes adapted to fit a non-rectangularly and non-cylindrically shaped space of the wearable electronic eyewear device when the at least two batteries are stacked on each other, the at least two battery cells having at least one of a different size or different shape from each other and respective positive terminals connected to each other and respective negative terminals connected to each other, fitting the selected at least two battery cells within the non-rectangularly and non-cylindrically shaped space, and connecting the at least two battery cells to the battery powered electronic device. In the sample configurations, selecting the non-rectangularly and non-cylindrically shaped space of the electronic eyewear device may include selecting a space within a temple, a hinge, or a frame of the wearable electronic eyewear device. The space may be selected based on a desired battery life, a proximity of electrical circuits that may lead to electrical interference, connectivity to the battery powered electronic device, and thermal considerations for heating of the at least two battery cells during use.

In further sample configurations, the method may include selecting at least a third battery cell stacked on the at least two battery cells in a terraced configuration. In such sample configurations, the at least third battery cell has at least one of a different size or different shape from the at least two battery cells wherein a collective size and shape of the at least two battery cells and the at least third battery cell are selected to fit the non-rectangularly and non-cylindrically shaped space. The battery cells in any of the configurations may be aligned along a common edge to connect the respective positive terminals to each other and the respective negative terminals to each other.

The following detailed description includes systems, methods, and techniques illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any element or component of an element constructed as otherwise described herein.

Reference now is made in detail to the examples illustrated in the accompanying drawings and discussed below.

Figure 1A:
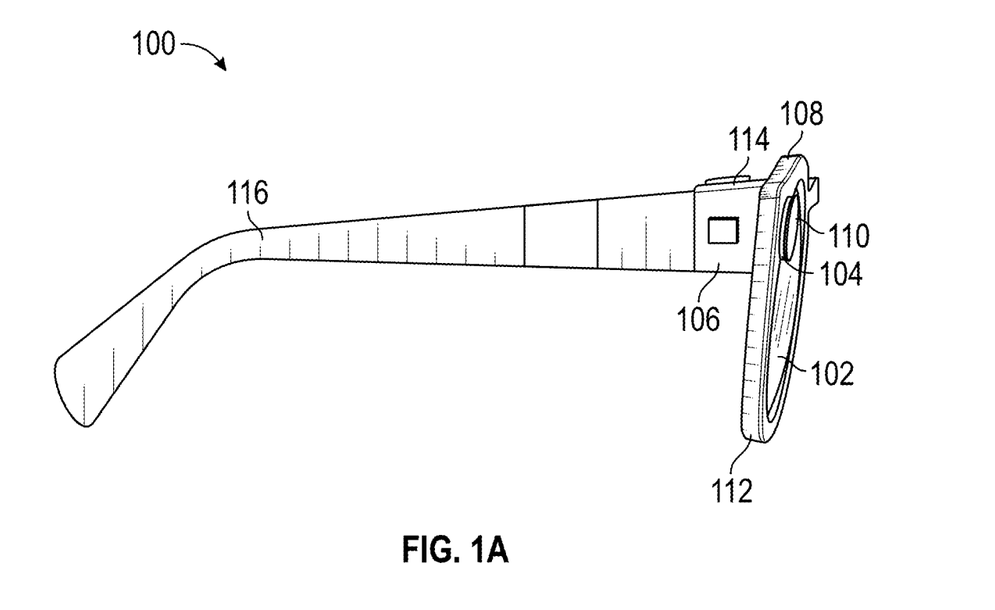
FIG. 1A illustrates a side view of an example hardware configuration of a wearable electronic eyewear device showing a right optical assembly with an image display.

FIG. 1A illustrates a side view of an example hardware configuration of a wearable electronic eyewear device 100 including a right optical assembly 102 adapted to include an image display (not shown). The wearable electronic eyewear device 100 may include multiple visible light cameras 104 in each optical assembly that form a stereo camera, of which the right visible light camera 104 is located on a right portion 106 of a frame 108 of the wearable electronic eyewear device 100 and a left visible light camera (not shown) is located on a left portion (not shown) of the frame 108 of the wearable electronic eyewear device 100.

The left and right visible light cameras 104 may include an image sensor that is sensitive to the visible light range wavelength. Each of the visible light cameras 104 has a different frontward facing angle of coverage, for example, right visible light camera 104 has the depicted angle of coverage 110. The angle of coverage 110 is an angle range in which the image sensor of the visible light camera 104 picks up electromagnetic radiation and generates images. Examples of such visible lights camera 104 include a high-resolution complementary metal-oxide-semiconductor (CMOS) image sensor and a video graphic array (VGA) camera, such as 640$p$ (e.g., 640×480 pixels for a total of 0.3 megapixels), 720p, or 1080p. Image sensor data from the visible light cameras 104 may be captured along with geolocation data, digitized by an image processor, and stored in a memory.

To provide stereoscopic vision, left and right visible light cameras 104 may be coupled to an image processor housed within the wearable electronic eyewear device 100 for digital processing along with a timestamp in which the image of the scene is captured. The image processor (not shown) may include circuitry to receive signals from the visible light cameras 104 and to process those signals from the visible light cameras 104 into a format suitable for storage in a memory (not shown) within the circuitry of the wearable electronic eyewear device. The timestamp may be added by the image processor or other processor that controls operation of the visible light cameras 104. In sample configurations, the visible light cameras 104 allow the stereo camera to simulate human binocular vision. Stereo cameras also provide the ability to reproduce three-dimensional images based on two captured images from the left and right visible light cameras 104, respectively, having the same timestamp. Such three-dimensional images allow for an immersive life-like experience, e.g., for virtual reality or video gaming. For stereoscopic vision, a pair of images may be generated at a given moment in time-one image for each of the left and right visible light cameras 104. When the pair of generated images from the frontward facing field of view (FOV) 110 of the left and right visible light cameras 104 are stitched together (e.g., by the image processor), depth perception is provided by the optical assembly 102.

In an example, the wearable electronic eyewear device 100 includes frame 108, a right rim 112, a right portion 106 of frame 108 adapted to house electronic components and extending from a right lateral side 114 of the frame 108, a see-through image display 102 adapted to present a graphical user interface to a user, and a temple 116 adapted to fit over the ear of a user of the wearable electronic eyewear device 100. Similarly, the wearable electronic eyewear device 100 includes the left visible light camera 104 connected to the frame 108 or the left portion of frame 108 adapted to house electronic components and extending from a left lateral side of the frame 108 to capture a first image of the scene. Wearable electronic eyewear device 100 further includes the right portion 106 of frame 108 adapted to house electronic components and extending from a right lateral side 114 of the frame 108 to capture (e.g., simultaneously with the left visible light camera) a second image of the scene which partially overlaps the first image. Although not shown in FIGS. 1A-1B, a processor may be coupled to the wearable electronic eyewear device 100 and connected to the left and right visible light cameras 104, and memory accessible to the processor and programming in the memory may be provided in the wearable electronic eyewear device 100 itself.

Figure 1B:
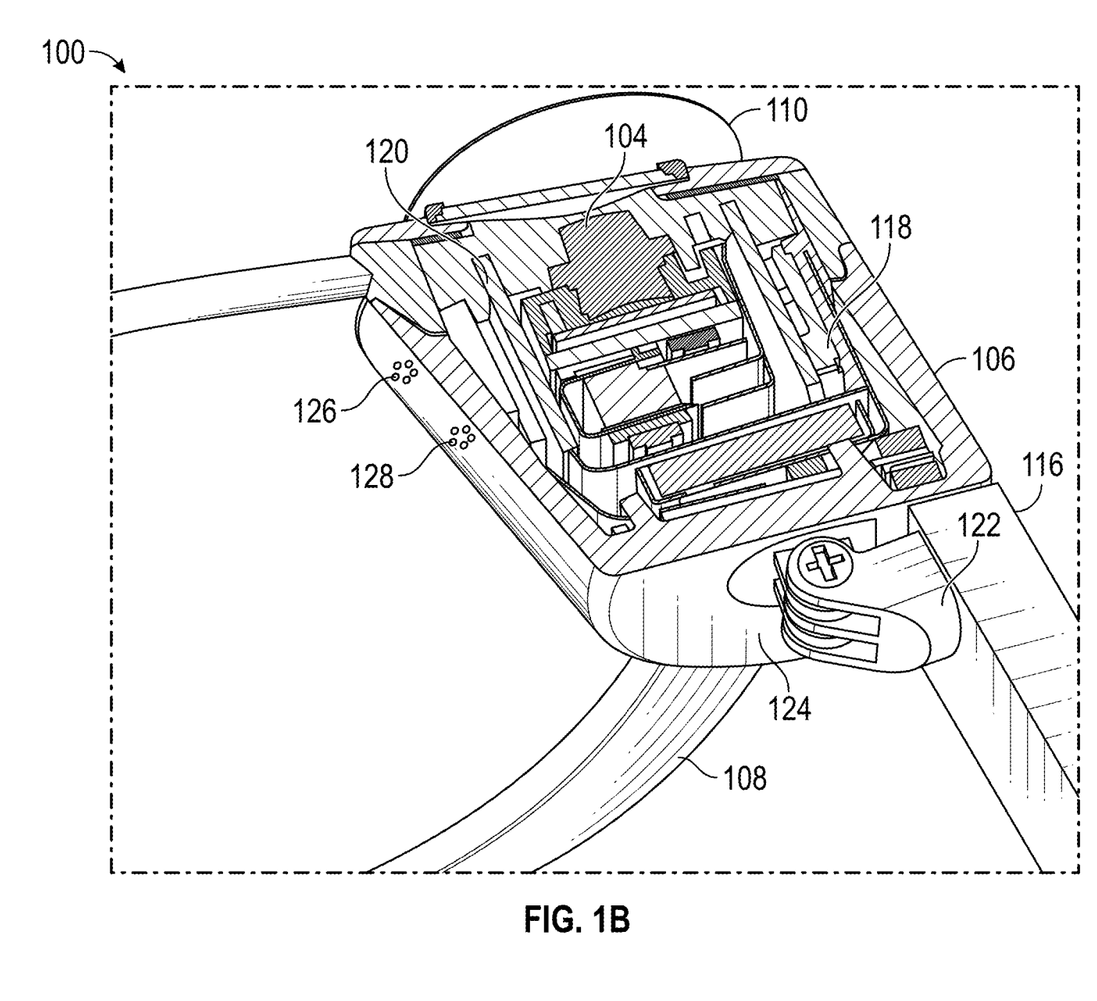
FIG. 1B illustrates a top cross-sectional view of a portion of a frame of the wearable electronic eyewear device of FIG. 1A that has been adapted to house electronic components.

FIG. 1B illustrates a top cross-sectional view of the portion 106 of the frame 108 of the wearable electronic eyewear device 100 of FIG. 1A that has been adapted to house electronic components. As illustrated, the wearable electronic eyewear device 100 may include a head movement tracker 118 or an eye movement tracker (not shown). Wearable electronic eyewear device 100 may further include see-through image displays of each optical assembly 102 for presenting a sequence of displayed images and an image display driver coupled to the see-through image displays of each optical assembly 102 to control the image displays of the optical assemblies 102 to present a sequence of displayed images. Wearable electronic eyewear device 100 may further include within the portion 106 of the frame 108 the memory and the processor on a circuit board 120 having access to an image display driver and the memory, as well as programming in the memory. Execution of the programming by the processor configures the wearable electronic eyewear device 100 to perform functions, including functions to present, via the see-through image displays, an initial displayed image of the sequence of displayed images, the initial displayed image having an initial field of view corresponding to an initial head direction or an initial eye gaze direction.

Execution of the programming by the processor may further configure the wearable electronic eyewear device 100 to detect movement of a user of the eyewear device by: (i) tracking, via the head movement tracker 118, a head movement of a head of the user, or (ii) tracking, via an eye movement tracker an eye movement of an eye of the user of the wearable electronic eyewear device 100. Execution of the programming by the processor may further configure the wearable electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor may further configure the wearable electronic eyewear device 100 to generate a successive displayed image of the sequence of displayed images based on the field of view adjustment. Execution of the programming by the processor may further configure the wearable electronic eyewear device 100 to present, via the see-through image displays of the optical assemblies 102, the successive displayed images.

FIG. 1B illustrates that the portion 106 of the frame 108 of the wearable electronic eyewear device 100 of FIG. 1A may include the right visible light camera 104, a head movement tracker 118, and a circuit board 120. Construction and placement of the left visible light camera is substantially similar to the right visible light camera 104, except the connections and coupling are on the left lateral side of the frame 108. As shown, the wearable electronic eyewear device 100 includes the right visible light camera 104 and a circuit board 120, which may be a flexible printed circuit board (PCB). A right hinge 122 connects the right portion 106 of the frame 108 to the temple 116 in the form of a hinged arm of the wearable electronic eyewear device 100. In some examples, components of the right visible light camera 104, the flexible PCB 120, or other electrical connectors or contacts may be located on the right portion 106 of the frame 108, in the temple 116, or within the right hinge 122.

As shown in FIG. 1B, the right portion 106 of the frame 108 includes a body 124 for housing the electronic components and a cap (not shown) that fits over the body 124 to enclose the electronic components. Disposed within the body 124 are various interconnected circuit boards, such as PCBs (Printed Circuit Boards) or flexible PCBs 120, that include controller circuits for right visible light camera 104, microphone(s) 126, speaker(s) 128, low-power wireless circuitry (e.g., for wireless short-range network communication via BLUETOOTH®), high-speed wireless circuitry (e.g., for wireless local area network communication via WI-FI®), and the like used in the operation of the wearable electronic eyewear device 100.

The right visible light camera 104 may be coupled to or disposed on the flexible PCB 120 and covered by a visible light camera cover lens, which is aimed through opening(s) formed in the right portion 106 of the frame 108. In some examples, the frame 108 includes the opening(s) for the visible light camera cover lens. The frame 108 may include a front-facing side configured to face outwards away from the eye of the user. The opening for the visible light camera cover lens may be formed on and through the front-facing side. In the example, the right visible light camera 104 may have an outward facing angle of coverage 110 with a line of sight or perspective of the right eye of the user of the wearable electronic eyewear device 100. The visible light camera cover lens also can be adhered to an outward facing surface of the right portion 106 of the frame 108 in which an opening is formed with an outward facing angle of coverage, but in a different outwards direction. The coupling can also be indirect via intervening components.

Similarly, a left visible light camera may be connected to a left see-through image display of a left optical assembly to generate a first background scene of a first successive displayed image. The right visible light camera 104 may be connected to the right see-through image display of the right optical assembly 102 to generate a second background scene of a second successive displayed image. The first background scene and the second background scene may partially overlap to present a three-dimensional observable area of the successive displayed image.

Flexible PCB 120 may be disposed inside the body 124 and coupled to one or more other components housed in the body 124 Although shown as being formed on the circuit boards 120 of the right portion 106 of the frame 108, the right visible light camera 104 can be formed on similar circuit boards of the left portion of the frame 108 or in the frame 108, and the electronic components may be disposed in a temple connected via a hinge to the left side of the frame 108, within the left hinge on the left side of the frame 108, or in the left portion of the frame 108.

It will be appreciated that the temples 116 on the respective sides of the frame 108 are eyeglass components that assist in holding the wearable electronic eyewear device 100 on the face of the user. The temples 116 include arms that extend from the frame 108 of the electronic eyewear device 100 and hook around the ears of the user. The temples 116 typically have a complex, organic shape, which is driven by comfort and aesthetics. In a wearable electronic eyewear device 100 such as augmented reality eyewear, the temples 116 may be adapted for use in housing other electronic components such as the batteries, antennas, speakers, and the like. However, due to the organic, non-rectangular shape of the temples 116, the space available to house the batteries is quite limited.

In order to improve battery life, it is desired to design the batteries such that the batteries more fully utilize the available space by, for example, using several battery cells with different geometries that are stacked on each other to form a single battery pack. These battery cells are typically electrically connected on a common side, and all other sides can vary from each other in geometry. This design approach enables the battery to better fit within a complex enclosure, which maximizes the packaging efficiency and therefore the battery volume and battery life. The number of stacked cells or terraces is theoretically not limited, so as this number increases, typically the packaging efficiency would also increase.

Figure 2A:
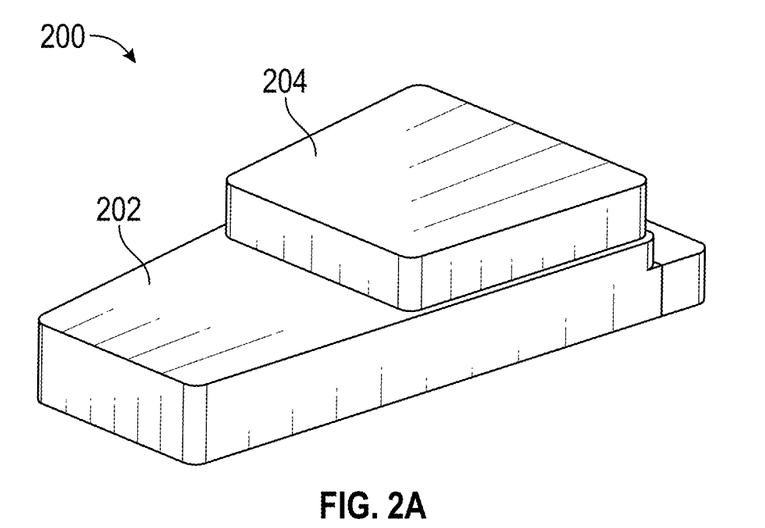
FIG. 2A illustrates a front perspective view of a two terraced battery in a sample configuration.

FIG. 2A illustrates a front perspective view of a two terraced battery 200 in a sample configuration. The terraced battery 200 includes a first rectangular cell 202 and a second rectangular cell 204 stacked on the first rectangular cell 202. Typically, the respective cells 202 and 204 are aligned along an edge to connect the respective positive terminals of the batteries together and the respective negative terminals of the batteries together for parallel (additive) operation. Also, a thin insulative coating may be provided around an outer perimeter of the respective cells 202 and 204 to electrically isolate the respective cells.

Figure 2B:
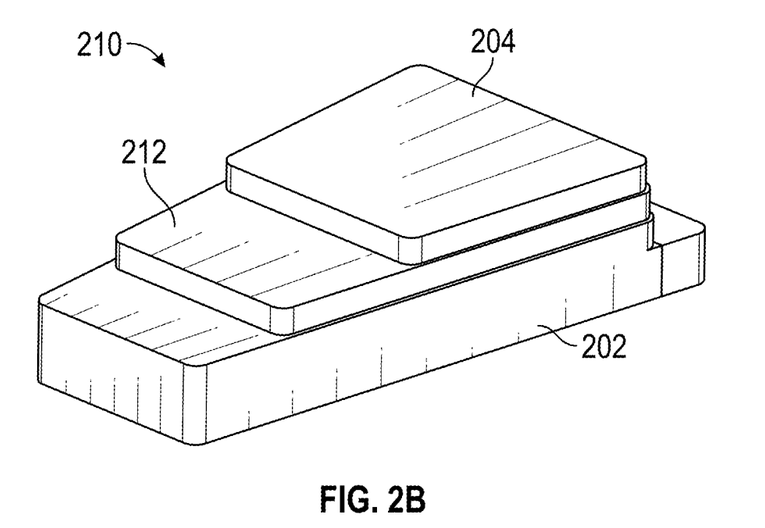
FIG. 2B illustrates a front perspective view of a three terraced battery in a sample configuration.

FIG. 2B illustrates a front perspective view of a three terraced battery 210 in a sample configuration. The terraced battery 210 includes the first rectangular cell 202 and the second rectangular cell 204 as well as a third rectangular cell 212 stacked on each other. Typically, the respective cells 202, 204, and 212 are aligned along an edge to connect the respective positive terminals of the batteries together and the respective negative terminals of the batteries together for parallel (additive) operation. Also, a thin insulative coating may be provided around an outer perimeter of the respective cells 202, 204, and 212 to electrically isolate the respective cells.

It will be appreciated that the respective batteries 202, 204, and 212 need not be rectangular in shape but also may be cylindrical, disc-shaped, trapezoidal, and the like. The shapes of the respective batteries are selected in accordance with the size and shape of the available battery compartment.

Figure 2C:
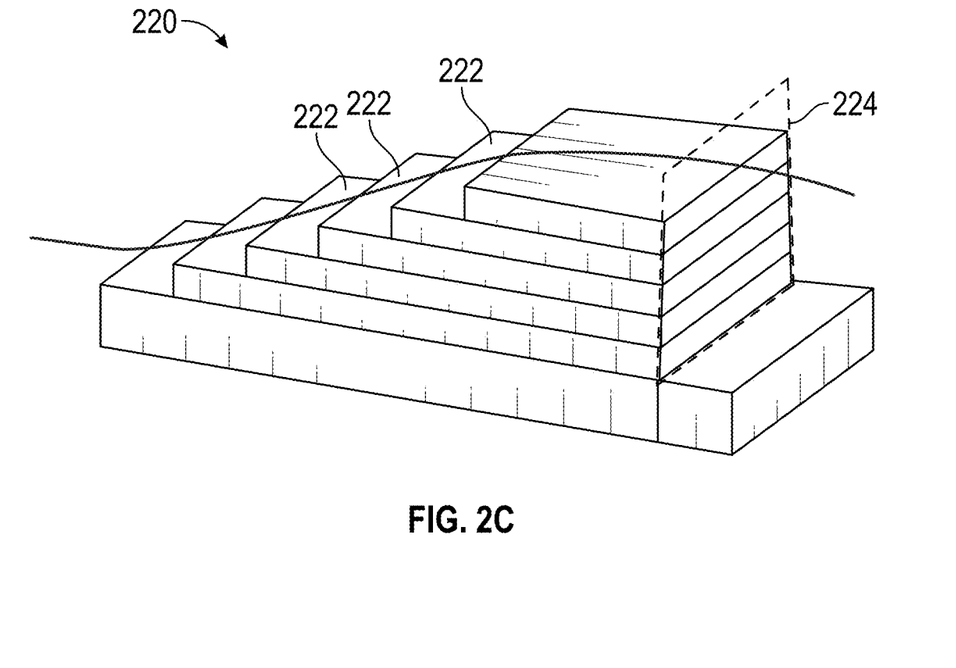
FIG. 2C illustrates a rear perspective view of a multi-terraced battery indicating that as the number of terrace steps increases the battery shape may approximate the organic shape of a battery enclosure.
Figure 2D:
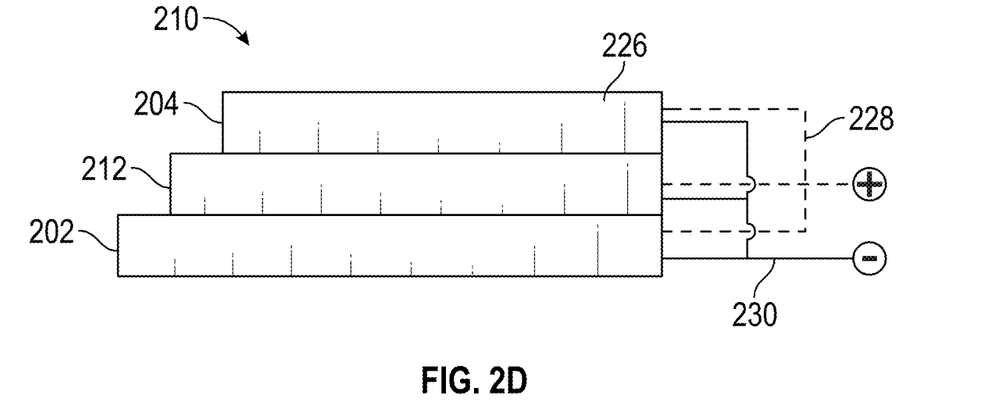
FIG. 2D illustrates a side view of the three terraced battery of FIG. 2B aligned along an edge for connection of the individual positive and negative leads.

FIG. 2C illustrates a rear perspective view of a multi-terraced battery 220 indicating that as the number of terrace steps 222 increases that the shape of the multi-terraced battery 220 may approximate the organic shape of a battery enclosure. As in the battery configurations of FIGS. 2A and 2B, the battery elements may be aligned along a single edge 224 to facilitate the connection of the respective individual positive leads and the respective individual negative leads. FIG. 2D illustrates a side view of the three terraced battery 210 of FIG. 2B aligned along an edge 226 for connection of the individual positive leads 228 and the individual negative leads 230. It will be appreciated that such alignment is not a strict requirement but facilitates the connections of the leads with a minimum of electric traces.

Figure 3A:
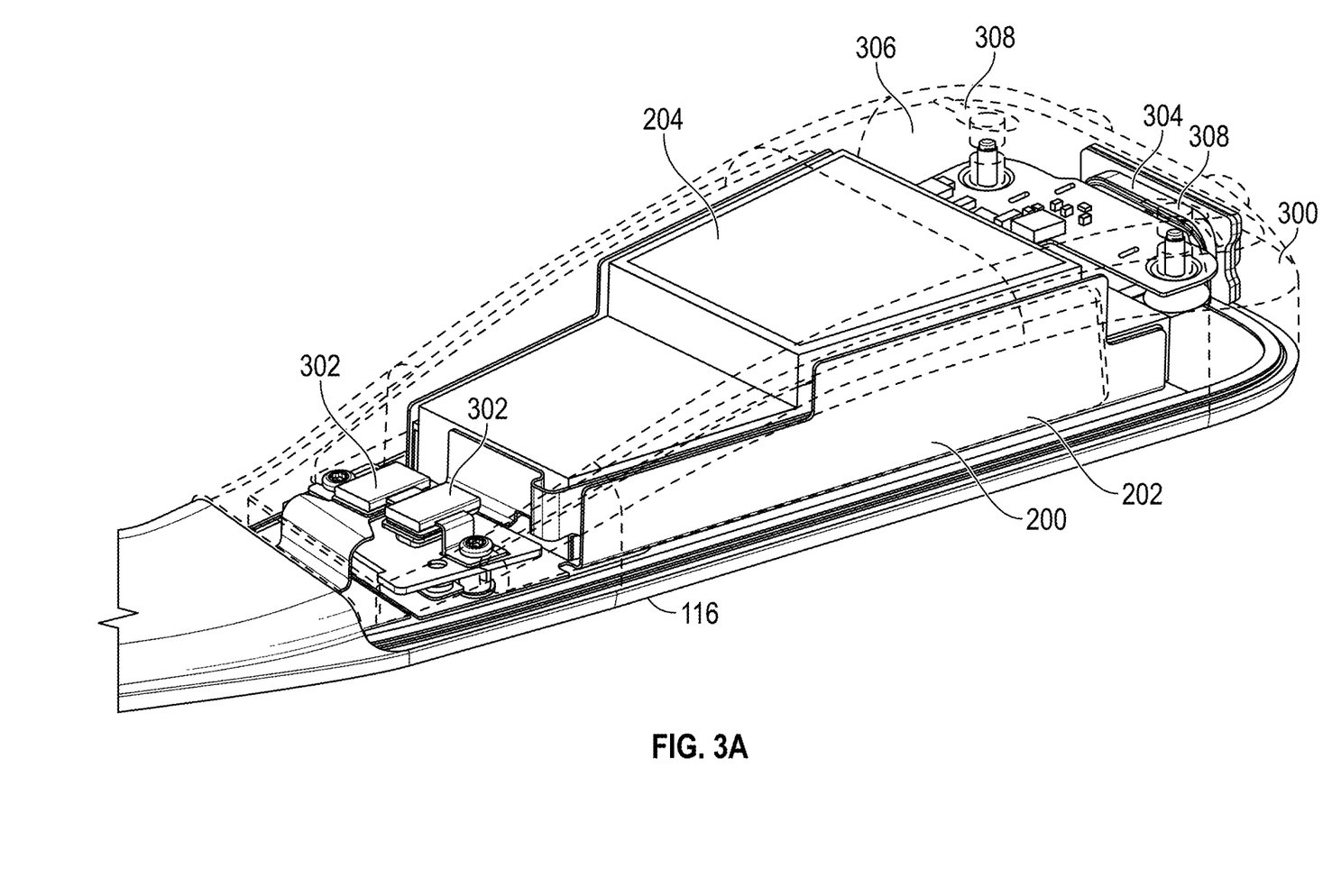
FIG. 3A illustrates a perspective view of a two terraced battery housed in a temple enclosure of a wearable electronic eyewear device of the type shown in FIGS. 1A and 1B.

FIG. 3A illustrates a perspective view of the two terraced battery 200 housed in a temple enclosure 300 of a wearable electronic eyewear device 100 of the type shown in FIGS. 1A and 1B. As illustrated, the two terraced battery 200 is adapted to fit within the available space of the organically (non-rectangularly or non-cylindrically) shaped temple enclosure 300. In FIG. 3A, the temple enclosure 300 is shown as transparent to enable viewing of the two terraced battery 200 and the positive/negative power connectors 302. The temple enclosure 300 may also include a connector 304 or one or more pins (e.g., pogo pins) adapted to connect the terraced battery 200 via a connector (e.g., USB-c connector) to an outside power source for charging. In sample configurations, the temple enclosure 300 may also include an openable plastic cap 306 that flexes on the side of the battery 200 to enable the cap 306 to disengage from posts 308 to open to provide access to the terraced battery 200.

Figure 3B:
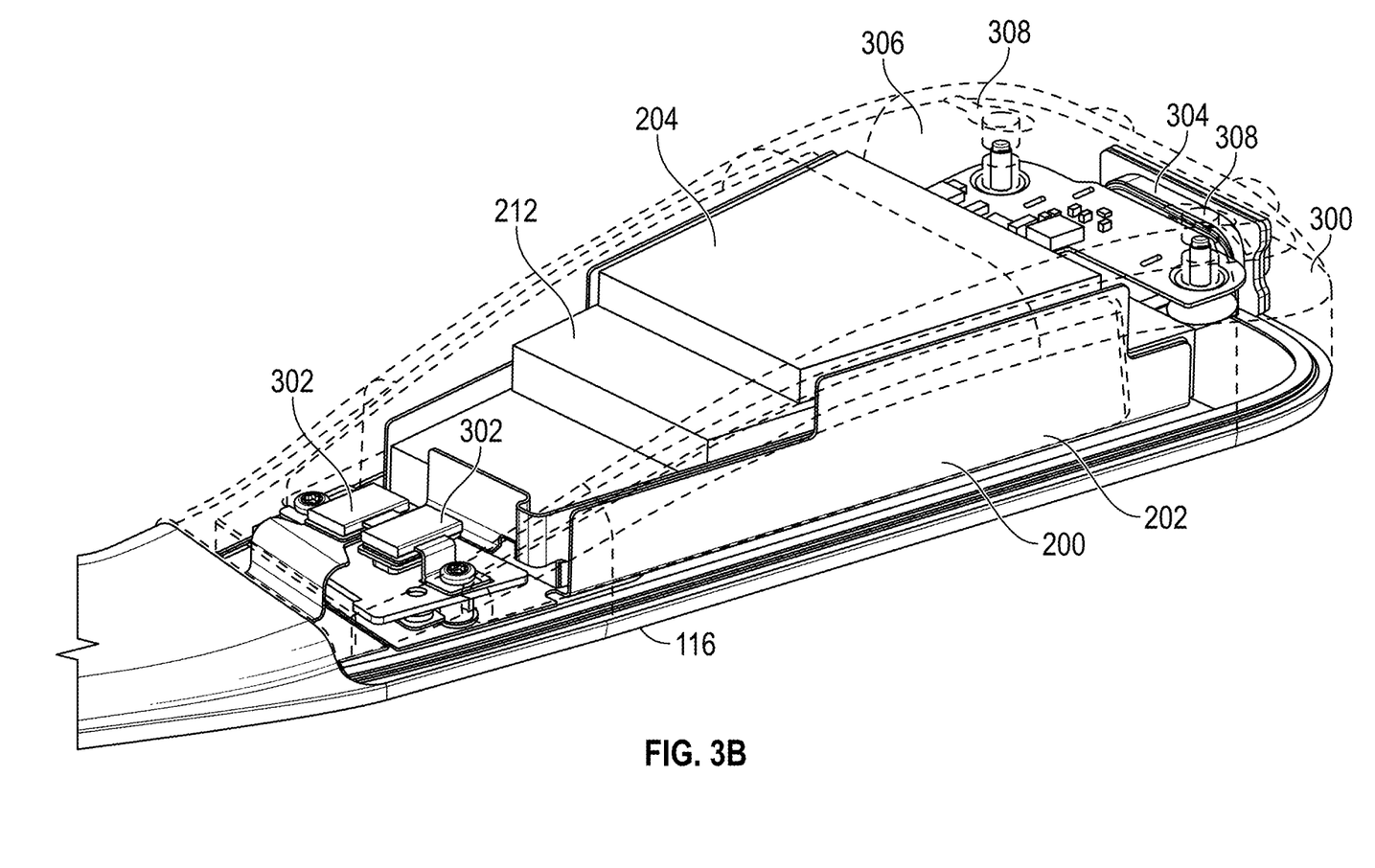
FIG. 3B illustrates a perspective view of a three terraced battery housed in a temple enclosure of a wearable electronic eyewear device of the type shown in FIGS. 1A and 1B.

FIG. 3B illustrates a perspective view of the three terraced battery 210 housed in a temple enclosure 300 of a wearable electronic eyewear device 100 of the type shown in FIGS. 1A and 1B. The configuration of FIG. 3B is the same as that in FIG. 3A except for the inclusion of the three terraced battery 210, which may have a geometry that is closer to that of the organically (non-rectangularly or non-cylindrically) shaped temple enclosure 300.

Figure 4:
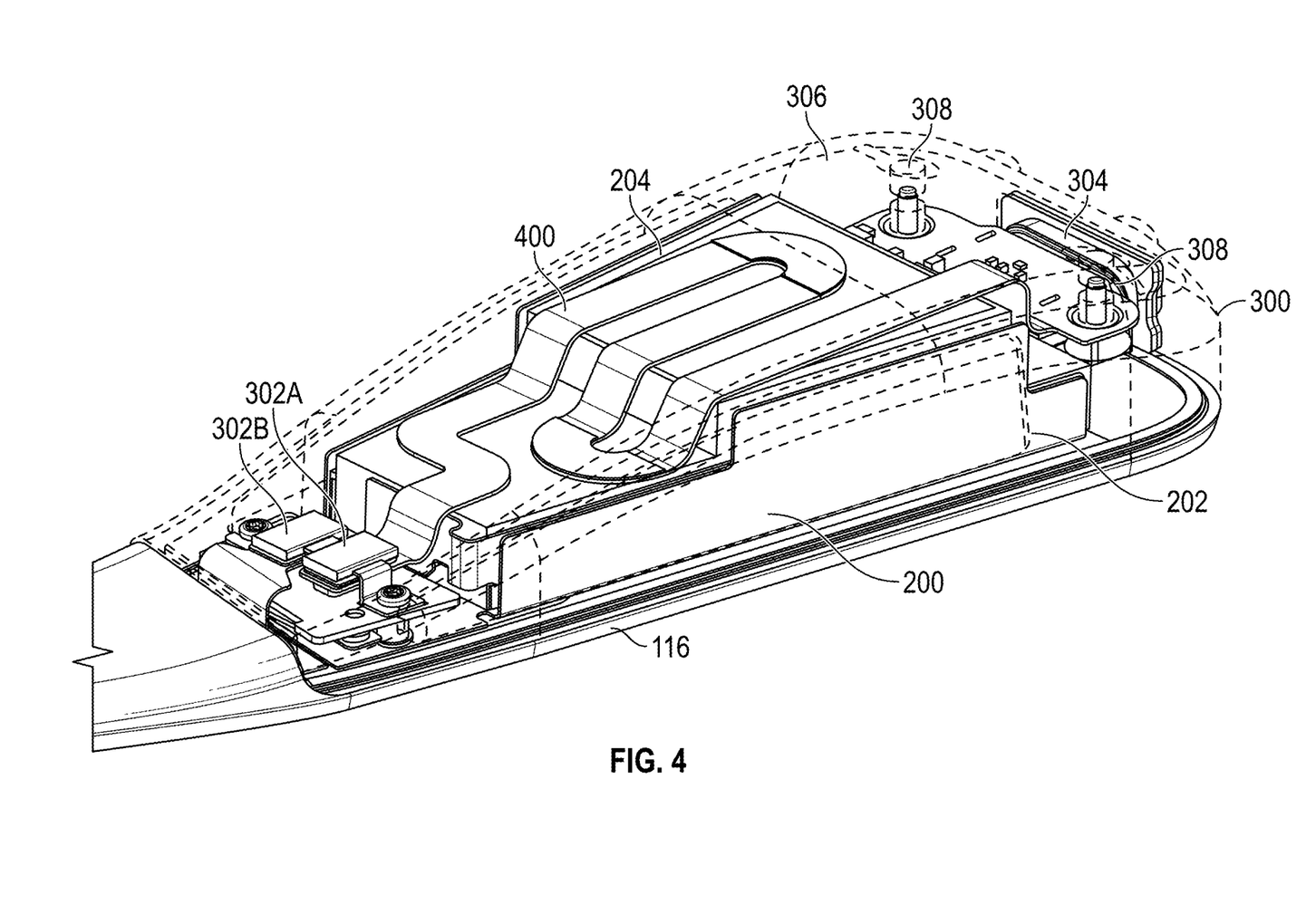
FIG. 4 illustrates a perspective view of the two terraced battery of FIG. 3A further including a connector lead adapted to run along a top surface of the terraced battery in a sample configuration.

FIG. 4 illustrates a perspective view of the two terraced battery 200 of FIG. 3A further including a connector lead 400 adapted to run along a surface (e.g., top or bottom) of the terraced battery 200 in a sample configuration. In the example of FIG. 4, one of the leads (e.g., the positive lead) of the respective cells 202 and 204 is connected to the connector lead 400 and wound (e.g., in a serpentine fashion) across the surface of the terraced battery 200 to power connector 302A to form a service loop. The other lead (e.g., the negative lead) may connect directly to the other power connector 302B. In sample configurations, the connector lead 400 is not flexible and is adhered to the surface of the battery 200 to further facilitate holding together the respective batteries 202 and 204. However, the connector lead 400 also may be flexible and may directly connect the battery terminals to the power connector 302B without the serpentine design illustrated in FIG. 4. In such configurations, the battery 200 and connector lead 400 are nested in the opening of the battery compartment within the temple 116 to improve usage of the space within the temple 116 while also allowing access to the batteries for changing.

Figure 5A:
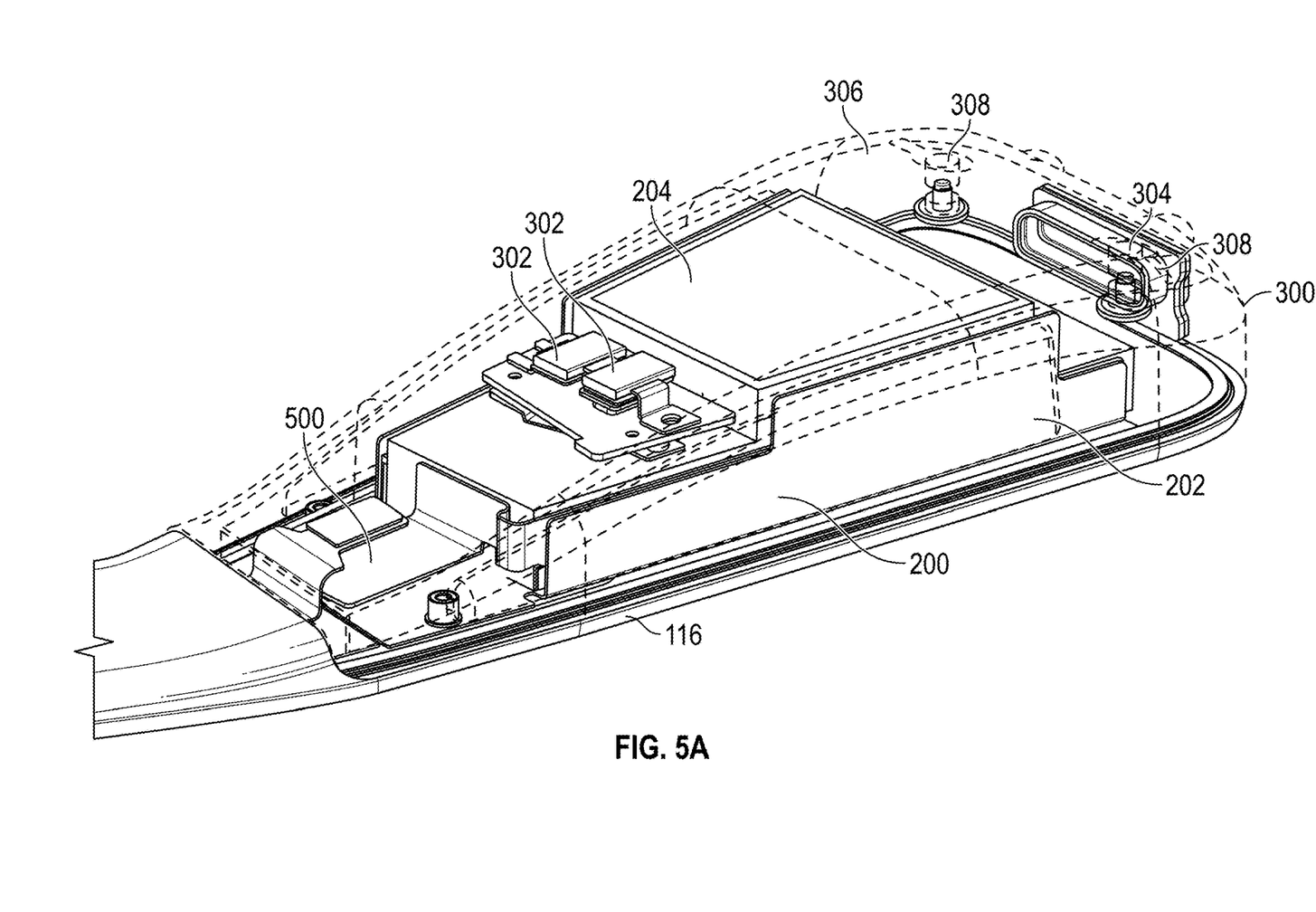
FIGS. 5A and 5B illustrate perspective views of the two terraced battery of FIG. 3A where the connectors to the electronic components are moved atop a first terrace of the two terraced battery in a sample configuration.
Figure 5B:
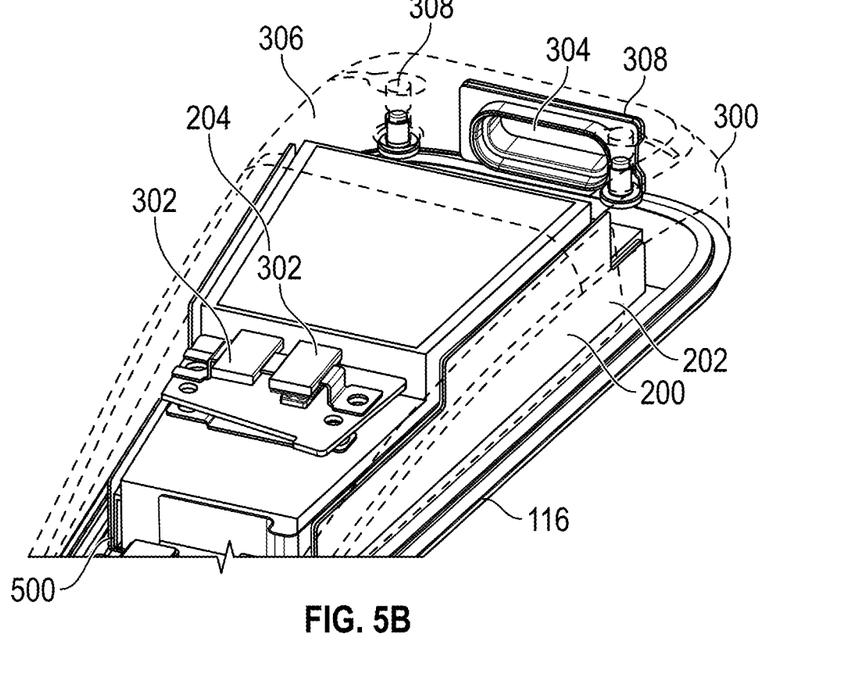

FIGS. 5A and 5B illustrate perspective views of the two terraced battery 200 of FIG. 3A where the power connectors 302 for providing power to the electronic components are moved adjacent (e.g., atop) the first terrace on the first battery 202 of the two terraced battery 200 in a sample configuration. In this configuration, further space is provided for the electronic components or other elements (e.g., speakers, antennas, etc.) within vacated space 500.

Although the terraced batteries described herein are shown for inclusion in the temple of an electronic eyewear device 100, it will be appreciated that the terraced batteries may be configured for insertion into any of a number of organically shaped spaces within the electronic eyewear device 100 such as spaces within the body 124, the hinges 122, the frame 108, and the like. The selection of the size and shape of the batteries for inclusion in the terraced design will be driven by the size and (non-rectangular or non-cylindrical) shape of the space for the battery compartment. Such adaptability in the battery shape and size provides the designer of the wearable electronic eyewear device 100 with many more options for where to place the battery system for improved battery packaging efficiency, improved battery life, and improved heat dissemination within the wearable electronic eyewear device 100.

For example, the designer may consider the form factor (scale and shape) of the available space for a battery compartment, the desired battery life, the proximity of other electrical circuits that may lead to electrical interference, connectivity to the electrical components to be powered, and thermal considerations for heating of the battery system during use to place the batteries in an optimal location within a wearable electronic device. As described herein, the respective battery cells are electrically isolated with a thin insulative coating and stacked upon each other to fit the available space of non-uniform (non-trapezoidal or non-cylindrical) thickness in the battery compartment. In sample configurations, the batteries may be co-located in a given space with other elements (e.g., antennas, speakers, etc.) to enhance the packaging efficiency of elements within the available space within the wearable electronic device.

It will be appreciated that the battery design described herein may be used in other devices besides wearable electronic eyewear devices 100 to improve the use of any organic shapes while optimizing the design options for component layout.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A terraced battery system comprising:
   a first battery cell;
   a second battery cell stacked on the first battery cell, the second battery cell having at least one of a different size or a different shape from the first battery cell, the stacked first and second battery cells having a collective shape that is non-rectangular and is non-cylindrical; and
   a non-flexible connector lead adhered to a surface of each of the first and second battery cells so as to facilitate holding together the first and second battery cells, the connector lead further adapted to run along a surface of the terraced battery system to connect to at least one of the power connection of a de ed b e first and second battery cells,
   wherein the first and second battery cells have respective positive terminals connected to each other and respective negative terminals connected to each other.

2. The terraced battery system of claim 1, further comprising a third battery cell upon which the first and the second battery cell are stacked, the third battery cell having at least one of a different size or a different shape from the first and second battery cells, wherein the first battery cell, second battery cell, and third battery cell are stacked in a terraced configuration.

3. The terraced battery system of claim 1, wherein the first battery cell and the second battery cell are aligned along a common edge to connect the respective positive terminals of the batteries together and the respective negative terminals of the batteries together.

4. The terraced battery system of claim 1, further comprising an insulative coating around an outer perimeter of the first battery cell and the second battery cell to electrically isolate the first battery cell and the second battery cell from each other.

5. The terraced battery system of claim 1, wherein the first battery cell and the second battery cell have shapes that are at least one of rectangular, trapezoidal, cylindrical, or disc-shaped and selected in accordance with a size and shape of a non-rectangularly and non-cylindrically shaped battery compartment.

6. The terraced battery system of claim 5, wherein the non-rectangularly and non-cylindrically shaped battery compartment comprises a temple enclosure of a wearable electronic eyewear device.

7. A wearable electronic eyewear device, comprising:
   a frame;
   at least one temple connected to the frame;
   at least one battery powered device;
   a battery compartment having power connections to the at least one battery powered device; and
   a terraced battery system disposed in the battery compartment, the terraced battery system comprising a first battery cell and a second battery cell stacked on the first battery cell, the second battery cell having at least one of a different size or different shape from the first battery cell, and a non-flexible connector lead adhered to a surface of each of the first and second battery cells so as to facilitate holding together the first and second battery cells, the connector lead further adapted to run along a surface of the terraced battery system to connect to at least one of the power connections, the first and second battery cells having respective positive terminals connected to each other and respective negative terminals connected to each other, wherein a collective shape of the stacked first and second battery cells is non-rectangular and is non-cylindrical.

8. The wearable electronic eyewear device of claim 7, wherein the battery compartment is disposed in the at least one temple and has a non-rectangular and non-cylindrical shape.

9. The wearable electronic eyewear device of claim 8, wherein the temple comprises a connector or pins adapted to connect the terraced battery system to an outside power source for charging.

10. The wearable electronic eyewear device of claim 8, wherein the at least one temple further comprises a cap adjacent an opening of the battery compartment that flexes to enable the cap to open to provide access to the terraced battery system within the battery compartment.

11. The wearable electronic eyewear device of claim 7, wherein the connector lead is wound across the surface of the terraced battery to form a service loop.

12. The wearable electronic eyewear device of claim 7, wherein the battery compartment comprises an opening, and wherein the terraced battery system and connector lead are nested in the opening of the battery compartment while allowing access to the terraced battery system.

13. The wearable electronic eyewear device of claim 7, wherein the power connections are located adjacent to one of the first or second battery cells.

14. The wearable electronic eyewear device of claim 7, wherein the terraced battery system is co-located with at least one of an antenna or a speaker within the battery compartment.

15. A method of providing power to a battery powered electronic device of a wearable electronic eyewear device, comprising:
   selecting at least two battery cells having sizes and shapes adapted to fit a non-rectangularly and non-cylindrically shaped battery compartment of the wearable electronic eyewear device when the at least two batteries are stacked on each other, the at least two battery cells having at least one of a different size or shape from each other, wherein the at least two battery cells have respective positive terminals connected to each other and respective negative terminals connected to each other;
   locating the selected at least two battery cells and at least one of an antenna or a speaker within the non-rectangularly and non-cylindrically shaped battery compartment; and
   connecting the at least two battery cells to the battery powered electronic device.

16. The method of claim 15, wherein selecting the non-rectangularly and non-cylindrically shaped battery compartment of the wearable electronic eyewear device comprises selecting a battery compartment within a temple, a hinge, or a frame of the wearable electronic eyewear device.

17. The method of claim 15, wherein selecting the non-rectangularly and non-cylindrically shaped battery compartment of the electronic eyewear device comprises selecting the non-rectangularly and non-cylindrically shaped battery compartment of the electronic eyewear device based on a desired battery life, a proximity of electrical circuits that may lead to electrical interference, connectivity to the battery powered electronic device, and thermal considerations for heating of the at least two battery cells during use.

18. The method of claim 15, further comprising selecting at least a third battery cell upon which the at least two battery cells are stacked in a terraced configuration, the at least third battery cell having at least one of a different size or different shape from the at least two battery cells, wherein a collective shape of the at least two battery cells and the at least third battery cell is selected to fit the non-rectangularly and non-cylindrically shaped battery compartment.

19. The method of claim 15, further comprising aligning the at least two battery cells along a common edge to connect the respective positive terminals to each other and the respective negative terminals to each other.

\* \* \* \* \*